United States Patent
Hill

(10) Patent No.: US 9,530,433 B2
(45) Date of Patent: Dec. 27, 2016

(54) VOICE ACTIVITY DETECTION FOR NOISE-CANCELING BIOACOUSTIC SENSOR

(71) Applicant: Sharp Laboratories of America, Inc., Camas, WA (US)

(72) Inventor: Fredrick Norman Hill, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 236 days.

(21) Appl. No.: 14/215,678

(22) Filed: Mar. 17, 2014

(65) Prior Publication Data

US 2015/0262591 A1 Sep. 17, 2015

(51) Int. Cl.
*G10L 25/78* (2013.01)
*G10L 21/0208* (2013.01)
*G10L 15/20* (2006.01)
*G10L 25/84* (2013.01)
*H04R 1/10* (2006.01)

(52) U.S. Cl.
CPC .......... *G10L 25/78* (2013.01); *G10L 21/0208* (2013.01); *G10L 15/20* (2013.01); *G10L 25/84* (2013.01); *G10L 2025/786* (2013.01); *H04R 1/1083* (2013.01)

(58) Field of Classification Search
CPC ...... G10L 21/00; G10L 21/02; G10L 21/0208; G10L 25/78; G10L 15/20; G10L 2021/02165; G10L 25/84; H04R 1/1083; H04R 2410/05
See application file for complete search history.

(56) References Cited

U.S. PATENT DOCUMENTS 4,052,568 A * 10/1977 Jankowski .............. G10L 25/78 704/233
4,625,083 A * 11/1986 Poikela ................... G10L 25/78 367/199

(Continued)

FOREIGN PATENT DOCUMENTS

JP 2002-258882 9/2002
WO WO03/096031 A2 11/2003

OTHER PUBLICATIONS

"Robust Speech Recognition and Understanding," Grimm & Kroschel eds., 2007, Ch.1, pp. 1-22.

(Continued)

*Primary Examiner* — Samuel G Neway
(74) *Attorney, Agent, or Firm* — Scot A. Reader

(57) ABSTRACT

A low overhead voice activity detection technique for a noise-canceling bioacoustic sensor consumes, as inputs, signals generated by a body microphone and an environment microphone and produces, as an output based on these inputs, an indication of whether voice activity is present. The technique applies a novel dual ANC configuration that produces, in addition to the normal noise reduction function, a signal composed of environmental sounds with body sounds attenuated and a signal composed of body sounds projected into the acoustic environment, primarily speech sounds. The technique then applies to these derived signals an algorithm based on the scientific observation that speech intensity, within limits, rises and falls to match environmental sound intensity to provide voice activity detection.

19 Claims, 3 Drawing Sheets

(56) References Cited

U.S. PATENT DOCUMENTS

| | | | | |
|---|---|---|---|---|
| 4,672,669 | A * | 6/1987 | DesBlache | G10L 25/78 704/237 |
| 5,459,814 | A * | 10/1995 | Gupta | G10L 25/78 704/214 |
| 5,853,005 | A * | 12/1998 | Scanlon | A61B 5/113 29/235.5 |
| 7,593,534 | B2 | 9/2009 | Andersen | |
| 7,881,927 | B1 * | 2/2011 | Reuss | G10L 25/78 704/226 |
| 8,019,091 | B2 * | 9/2011 | Burnett | G10L 21/02 381/71.8 |
| 8,494,829 | B2 | 7/2013 | Teixeira | |
| 8,589,158 | B2 | 11/2013 | Gass et al. | |
| 2002/0094845 | A1 * | 7/2002 | Inasaka | H04M 1/05 455/566 |
| 2003/0061040 | A1 * | 3/2003 | Likhachev | G10L 25/78 704/250 |
| 2003/0179888 | A1 * | 9/2003 | Burnett | G10L 21/0208 381/71.8 |
| 2004/0042626 | A1 * | 3/2004 | Balan | G10L 25/78 381/110 |
| 2009/0089053 | A1 * | 4/2009 | Wang | G10L 25/78 704/233 |
| 2014/0341386 | A1 * | 11/2014 | Cimaz | H04R 3/005 381/71.6 |
| 2015/0119758 | A1 * | 4/2015 | Rogers | A61B 7/04 600/586 |
| 2015/0262591 | A1 * | 9/2015 | Hill | G10L 21/0208 704/233 |

OTHER PUBLICATIONS

Olsen, "Average Speech Levels and Spectra in Various Speaking/Listening Conditions: A Summary of the Pearson, Bennett & Fidell (1977) Report," Am. J. Aud., vol. 7, 1998, pp. 1-5.

Ramirez et al., "An Effective Subband OSF-Based VAD with Noise Reduction for Robust Speech Recognition," IEEE Trans. on Speech & Aud. Proc., vol. 13, No. 6, 2005, pp. 1119-1129.

Haykin, "Adaptive Filter Theory," 3rd. ed., 1996, Ch. 11, pp. 483-535.

* cited by examiner

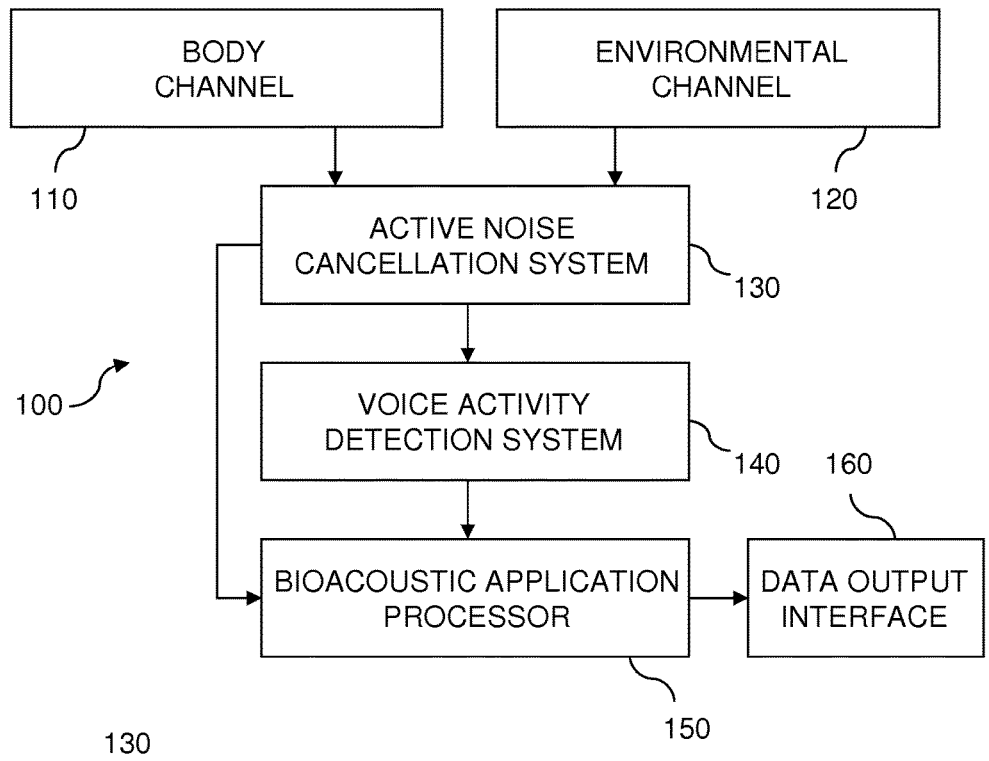
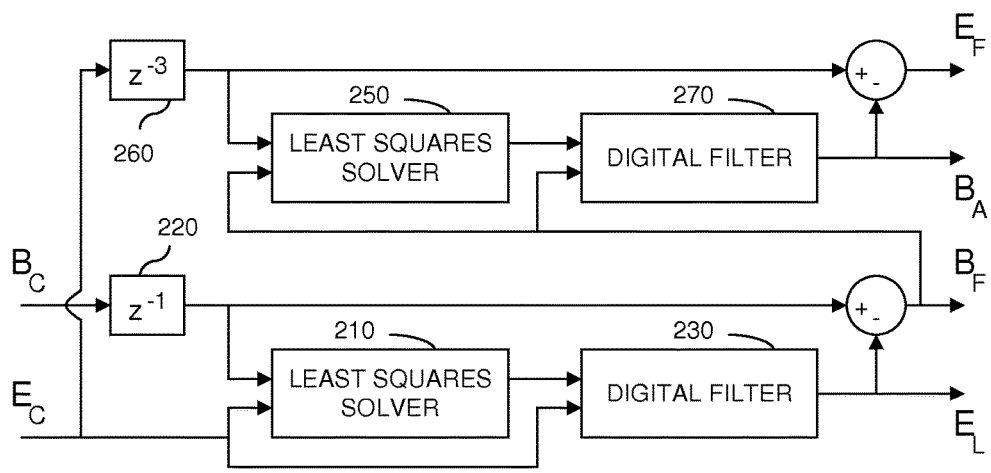

VOICE ACTIVITY DETECTION FOR NOISE-CANCELING BIOACOUSTIC SENSOR

BACKGROUND OF THE INVENTION

The present invention relates to voice activity detection and, more particularly, a low overhead voice activity detection technique for a noise-canceling bioacoustic sensor.

Noise-canceling bioacoustic sensors collect sounds from the human body that can be applied to a variety of medical and health diagnostic purposes, such as monitoring vital signs and detecting health problems. An exemplary sensor has a body microphone that collects body sounds of interest which is generally coupled to the body surface near the source of the sounds, such as at the chest or tracheal notch, and is oriented to have greatest sensitivity in the direction of the body. Despite best efforts to insulate the body microphone from the surrounding environment, environmental noise routinely leaks into the body sound channel. Accordingly, the sensor also has an environmental microphone that collects environmental sounds and is used to cancel environmental noise that infiltrates the body sound channel. In contrast to the body microphone, the environmental microphone is generally oriented to have greatest sensitivity in the direction away from the body.

In addition to dual microphones, noise-canceling bioacoustic sensors have active noise cancellation (ANC) systems. These ANC systems apply algorithms to the microphone signals to remove environmental noise from the body sound channel. These ANC systems then output a filtered body sound signal with environmental sounds greatly attenuated.

Speech can be a significant source of interference in bioacoustic sensing applications. In some applications, such as vital sign monitoring and health diagnostics, speech can corrupt the body sound signal, causing the application to perform poorly. In other bioacoustic sensing applications, it may be desirable to detect speech so that its informational content can be decoded and used.

Robust speech detection techniques that do not rely on ANC systems have been developed. For example, long-term spectral divergence voice activity detection techniques detect speech by processing a multiband spectral envelope over a rolling window. However, these techniques perform spectral analysis and statistical computations that are processor intensive and impose considerable system overhead.

SUMMARY OF THE INVENTION

The present invention is directed to a low overhead voice activity detection technique for a noise-canceling bioacoustic sensor. The voice activity detection technique of the present invention consumes, as inputs, signals generated by a body microphone and an environment microphone. Those signals may be filtered (e.g, with an analog or digital bandpass filter) to limit frequency content to the application range of interest. The technique produces, based on these inputs, an indication of whether voice activity is present. The present technique detects voice activity from the microphone signals by applying a novel dual ANC configuration to those signals. In addition to the normal noise reduction function, the ANC produces: (a) a signal composed of environmental sounds with body sounds attenuated and (b) a signal composed of body sounds projected into the acoustic environment, primarily speech sounds. An algorithm based on the scientific observation that speech intensity, within limits, rises and falls to match environmental sound intensity is then applied to these derived signals to provide voice activity detection. The technique is applicable to narrow bandwidth signals without the high overhead of approaches that rely on processor intensive spectral analysis and statistical computations.

In one aspect of the invention, a voice activity detection method comprises acquiring a body channel signal and an environment channel signal; deriving from the body channel signal and the environment channel signal a filtered environment signal comprising environmental sounds with body sounds attenuated and a body acoustic signal comprising body sounds projected into an acoustic environment; setting a voice activity detection threshold based on the filtered environment signal; detecting whether voice activity is present based on a comparison of the body acoustic signal with the voice activity detection threshold; and outputting an indication of whether voice activity is present.

In some embodiments, presence of voice activity is detected when an intensity of the body acoustic signal is above the voice activity detection threshold.

In some embodiments, the intensity of the body acoustic signal is computed as a root mean squared (RMS) average of the body acoustic signal.

In some embodiments, the voice activity detection threshold is set based on an intensity of the filtered environment signal.

In some embodiments, the intensity of the filtered environment signal is computed as an RMS average of the filtered environment signal.

In some embodiments, the voice activity detection threshold is set to a predetermined minimum when an intensity of the filtered environment signal is below a predetermined value.

In some embodiments, the voice activity detection threshold is set to a predetermined maximum when an intensity of the filtered environment signal is above a predetermined value.

In some embodiments, the voice activity detection threshold is dynamically adjusted based on changes in intensity of the filtered environment signal.

In some embodiments, the filtered environment signal is derived by subtracting the body acoustic signal from the environment channel signal.

In another aspect of the invention, a bioacoustic sensor comprises a body channel configured to acquire a body channel signal; an environmental channel configured to acquire an environment channel signal; an active noise cancellation system configured to derive from the body channel signal and the environment channel signal a filtered environment signal comprising environmental sounds with body sounds attenuated and a body acoustic signal comprising body sounds projected into an acoustic environment; and a voice activity detection system configured to set a voice activity detection threshold based on the filtered environment signal, detect whether voice activity is present based on a comparison of the body acoustic signal with the voice activity detection threshold and output an indication of whether voice activity is present.

These and other aspects of the invention will be better understood by reference to the following detailed description taken in conjunction with the drawings that are briefly described below. Of course, the invention is defined by the appended claims.

BRIEF DESCRIPTION OF THE DRAWINGS

FIG. 1 shows a noise-canceling bioacoustic sensor in some embodiments of the invention.

FIG. 2 shows an ANC system of a noise-canceling bioacoustic sensor in some embodiments of the invention.

DETAILED DESCRIPTION OF A PREFERRED EMBODIMENT

Figure 3:
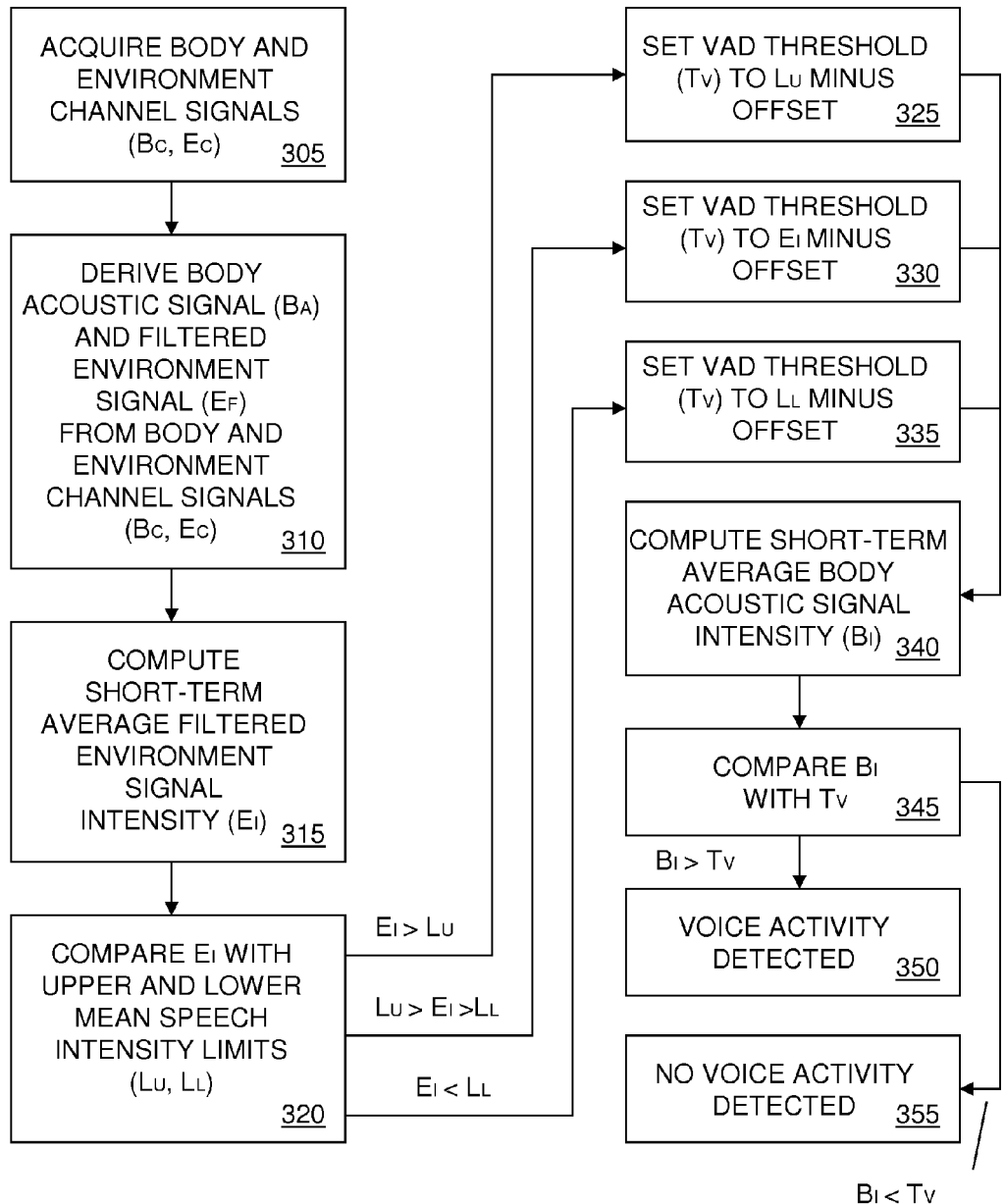
FIG. 3 shows a voice activity detection method in some embodiments of the invention.

FIG. 1 shows a noise-canceling bioacoustic sensor 100 in some embodiments of the invention. Sensor 100 has a body channel 110 which includes a body microphone that collects body sounds and is positioned on or adjacent the body surface of a human subject, such as at the subject's chest or tracheal notch. The body microphone is oriented to have greatest sensitivity in the direction of the subject's body. Body channel 110 transmits a continuous body channel signal to an ANC system 130.

Sensor 100 also has an environment channel 120 which includes an environment microphone that collects environmental sounds and is oriented to have greatest sensitivity in the direction away from the subject's body. Environment channel 120 transmits a continuous environment channel signal to ANC system 130.

FIG. 2 shows ANC system 130. ANC system 130 separates the body channel ($B_C$) and environment channel ($E_C$) signals into filtered body ($B_F$), environment leakage ($E_L$), filtered environment ($E_F$), and body acoustic ($B_A$) signals. ANC system 130 continuously transmits these resulting component signals to a voice activity detection system 140 and a bioacoustic application processor 150.

In detail, ANC system 130 receives the body channel ($B_C$) and environment channel ($E_C$) signals as continuous inputs. The lower ANC components in FIG. 2 generate outputs to bioacoustic application processor 150. The upper components generate outputs to voice activity detection system 140. To generate outputs for bioacoustic application processor 150, a delay 220 is applied to the body channel signal and a least squares solver 210 is used to generate a digital filter 230 that minimizes over a small time interval the difference between the squares of the body channel signal and the product of the environment channel signal and filter 230. Filter 230 is then applied to the environment channel signal to yield the environment leakage ($E_L$) which is an estimate of the environment signal which leaked into the body channel. This leakage estimate is subtracted from the body channel signal to yield a denoised filtered body signal ($B_F$).

A similar process is used to generate the filtered environment ($E_F$) and body acoustic ($B_A$) signals for use in the voice activity detection. A delay 260 is applied to the environment channel signal and a least squares solver 250 is used to generate a digital filter 270 that minimizes over a small time interval the difference between the squares of the environment channel signal and the product of the filtered body signal and filter 270. Filter 270 is then applied to the filtered body signal to yield the body acoustic signal ($B_A$) which is an estimate of the body signal entering into the environment channel. This estimate is subtracted from the environment channel signal to yield a filtered environment signal ($E_F$).

Returning to FIG. 1, ANC system 130 continuously transmits the filtered environment and the body acoustic signals to voice activity detection system 140 and continuously transmits the filtered body and environment leakage signals to bioacoustic application processor 150.

Voice activity detection system 140 applies the filtered environment and body acoustic signals derived by ANC system 130 to determine when voice activity is present. Voice activity detection system 140 operates on the scientifically observed principle that speech intensity, within limits, rises and falls to match environmental sound intensity. Thus, in quiet environments, where environmental noise is below about 40 decibels SPLA (sound pressure level A-weighted), mean speech intensity drops to a floor value. In moderately noisy environments, where environmental noise is in the range of about 40 to 70 decibels, mean speech intensity rises or falls to match (or overcome) the environmental noise. And in very noisy environments, where environmental noise is above about 70 decibels, mean speech intensity is limited to a ceiling value. Voice activity detection system 140 applies the scientifically observed relationship between human speech intensity (as reflected in the body acoustic signal) and environmental sound intensity (as reflected in the filtered environment signal) to detect when voice activity is present. Specifically, voice activity detection system 140 sets a voice activity detection threshold based on the intensity of the filtered environment signal, detects whether voice activity is present based on a comparison of the intensity of the body acoustic signal with the voice activity detection threshold and outputs to bioacoustic application processor 150 an indication of whether voice activity is present based on the outcome of the comparison. Bioacoustic application processor 150 applies the voice activity indications received from voice activity detection system 140 to various purposes, such as noise mitigation and voice recognition, and transmits to data output interface 160 output data generated based at least in part on these voice activity indications. Data output interface 160 may, for example, display the output data locally, relay them to a remote clinician facility, or both.

FIG. 3 shows a voice activity detection method performed on sensor 100 in some embodiments of the invention. The method steps may be performed by executing software instructions under microprocessor control, in custom circuitry, or in some combination. The method steps are generally performed continuously to achieve real-time, adaptive voice activity detection.

First, body channel 110 and environment channel 120 acquire body channel ($B_C$) and environment channel ($E_C$) signals, respectively (305) over a small (e.g., 20 ms) time interval. These channel signals are passed to ANC system 130.

Next, ANC system 130 derives a filtered environment signal and a body acoustic signal from the original channel signals (310). These derivative signals are provided to voice activity detection system 140.

Next, voice activity detection system 140 computes the short-term average intensity of the filtered environment signal (315). The short-term average filtered environment signal intensity ($E_I$) is computed as an RMS average of the filtered environment signal.

Next, voice activity detection system 140 compares the average filtered environment signal intensity ($E_I$) with upper and lower mean speech intensity limits ($L_U$, $L_L$) (320). As mentioned, mean human speech intensity has a ceiling and a floor above and below which it typically does not rise or fall regardless of environmental sound intensity. Upper and lower mean speech intensity limits are set in accordance with this floor and ceiling, either adaptively or statically. In some embodiments, the upper mean speech intensity limit is set to 70 decibels and the lower mean speech intensity limit is set to 40 decibels.

Next, voice activity detection 140 sets a voice activity detection threshold ($T_V$) based on the result of the comparisons in Step 320. If the average filtered environment signal intensity ($E_I$) exceeds the upper mean speech intensity limit ($L_U$), the voice activity detection threshold is set to the upper limit minus an offset (325). If the average filtered environment signal intensity is between the upper mean speech intensity limit ($L_U$) and the lower mean speech intensity limit ($L_L$), the voice activity detection threshold is set to the average filtered environment signal intensity minus an offset (330). If the average filtered environment signal intensity is below the lower mean speech intensity limit ($L_L$), the voice activity detection threshold is set to the lower limit minus an offset (335). The offset may be, for example, a predetermined constant which is an approximation of a lower three sigma limit around the mean.

Next, voice activity detection system 140 computes the short-term average body acoustic signal intensity ($B_I$) of the body acoustic signal (340). The short-term average body acoustic signal intensity is computed as an RMS average of the body acoustic signal.

Next, voice activity detection system 140 compares the short-term average body acoustic signal intensity with the voice activity detection threshold (345).

Finally, voice activity detection 140 provides a voice activity detection indication based on the result of the comparison. If the average body acoustic signal intensity exceeds the voice activity detection threshold ($T_V$), voice activity is detected and an indication that voice activity is present is transmitted to bioacoustic application processor 150 (350). On the other hand, if the average body acoustic signal intensity is below the voice activity detection threshold, an absence of voice activity is detected and an indication that voice activity is absent is transmitted to bioacoustic application processor 150 (355).

Figure 4:
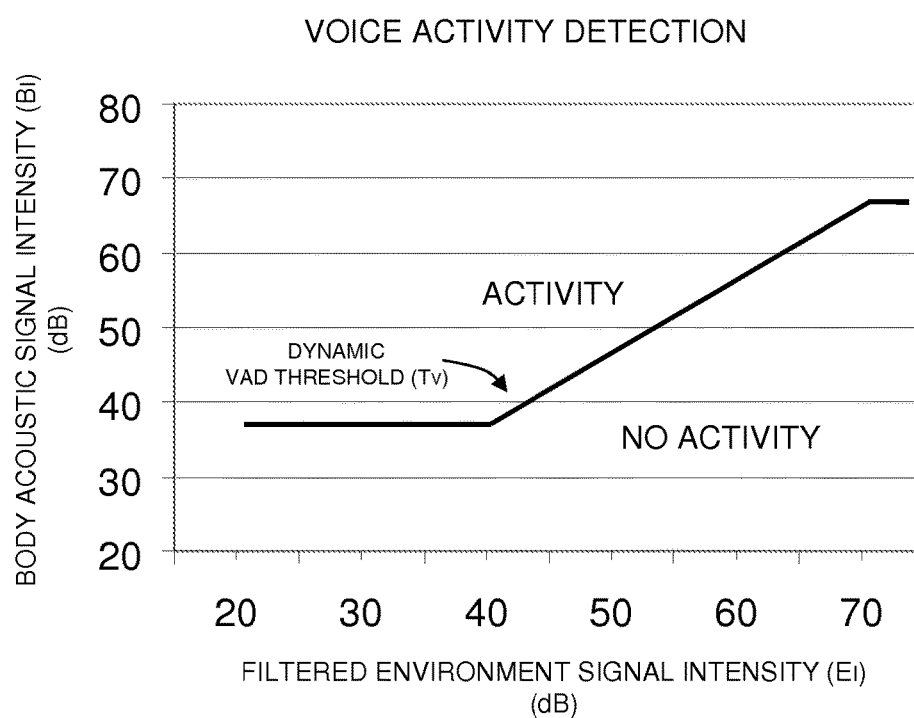
FIG. 4 shows voice activity detection as a function of filtered environment signal intensity and body acoustic signal intensity.

The method is then repeated in a continuous loop, resulting in real-time, adaptive voice activity detection in which the voice activity detection threshold is continuously adjusted to account for real-time changes in environmental sound intensity (as reflected in changes in short-term average intensity of the filtered environment signal) and continuously compared with speech sound intensity (as reflected in short-term average body acoustic signal intensity) to provide real-time voice activity detection indications. For example, as shown in FIG. 4, the voice activity detection threshold changes over time, within limits at 40 and 70 decibels (SPLA) (minus an offset), to account for changes in the short-term average filtered environment signal intensity. This dynamic threshold provides the dividing line between a voice activity region, where short-term average body acoustic signal intensity exceeds the threshold, and a no voice activity region, where short-term average body acoustic signal is below the threshold.

It will be appreciated by those of ordinary skill in the art that the invention can be embodied in other specific forms without departing from the spirit or essential character hereof. The present description is considered in all respects to be illustrative and not restrictive. The scope of the invention is indicated by the appended claims, and all changes that come within the meaning and range of equivalents thereof are intended to be embraced therein.

What is claimed is:

1. A biacoustic sensor having voice detection capability, comprising:
    a body channel configured to acquire a body channel signal;
    an environmental channel configured to acquire an environment channel signal;
    an active noise cancelation (ANC) system configured to receive the body channel signal and the environment channel signal and output a multiple of derivative signals, wherein each of the derivative signals is derivative of the body channel signal and the environment channel signal and is different from the other derivative signals;
    a voice activity detection system configured to receive from the ANC system a first one or more of the derivative signals including a body acoustic signal and output a voice activity presence indicator generated using the first one or more of the derivative signals; and
    a bioacoustic application processor configured to receive from the ANC system a second one or more of the derivative signals including a filtered body signal, receive from the voice activity detection system the voice activity presence indicator and generate output data, wherein the body acoustic signal is derived from the filtered body signal.

2. The sensor of claim 1, wherein the filtered body signal expresses body sounds with environmental sounds attenuated.

3. The sensor of claim 1, wherein the second one or more of the derivative signals further include an environmental leakage signal expressing environmental sound leakage into the body channel.

4. The sensor of claim 2, wherein the body acoustic signal provides an estimate of body sounds in the environmental channel.

5. The sensor of claim 4, wherein the first one or more of the derivative signals further include a filtered environment signal expressing environmental sounds with body sounds attenuated.

6. The sensor of claim 5, wherein the voice activity detection system is configured to set a voice activity detection threshold based on the filtered environment signal, detect whether voice activity is present based on a comparison of the body acoustic signal with the voice activity detection threshold and set the voice activity presence indicator based on whether voice activity is detected to be present.

7. The sensor of claim 6, wherein voice activity is detected to be present when an intensity of the body acoustic signal is above the voice activity detection threshold.

8. The sensor of claim 7, wherein the intensity of the body acoustic signal is computed as a root mean squared (RMS) average of the body acoustic signal.

9. The sensor of claim 6, wherein the voice activity detection threshold is set based on an intensity of the filtered environment signal.

10. The sensor of claim 6, wherein the voice activity detection threshold is set to a predetermined minimum when an intensity of the filtered environment signal is below a predetermined value.

11. The sensor of claim 6, wherein the voice activity detection threshold is set to a predetermined maximum when an intensity of the filtered environment signal is above a predetermined value.

12. The sensor of claim 6, wherein the voice activity detection threshold is dynamically adjusted based on changes in intensity of the filtered environment signal.

13. The sensor of claim 1, wherein the body channel is configured to collect body sounds at a chest or tracheal notch of a human subject.

14. A bioacoustic sensing method with voice detection capability, comprising:
  acquiring, by a body channel, a body channel signal;
  acquiring, by an environmental channel, an environment channel signal;
  generating, by an active noise cancelation element, a multiple of derivative signals, wherein each of the derivative signals is derivative of the body channel signal and the environment channel signal and is different from the other derivative signals;
  generating, by a voice activity detection element, using a first one or more of the derivative signals including a body acoustic signal, a voice activity presence indicator;
  providing, to a bioacoustic application processing element, a second one or more of the derivative signals including a filtered body signal and the voice activity presence indicator; and
  generating, by the bioacoustic application processing element, using at least one of the second one or more of the derivative signals or the voice activity presence indicator, output data, wherein the body acoustic signal is derived from the filtered body signal.

15. The method of claim 14, wherein the filtered body signal expresses body sounds with environmental sounds attenuated.

16. The method of claim 15, wherein the second one or more of the derivative signals further include an environmental leakage signal expressing environmental sound leakage into the body channel.

17. The method of claim 14, wherein the body acoustic signal provides an estimate of body sounds in the environmental channel.

18. The method of claim 17, wherein the first one or more of the derivative signals further include a filtered environment signal expressing environmental sounds with body sound attenuated.

19. The method of claim 14, wherein the body channel signal expresses body sounds collected at a chest or tracheal notch of a human subject.

\* \* \* \* \*